United States Patent [19]

Hiral

[11] Patent Number: 5,424,039

[45] Date of Patent: Jun. 13, 1995

[54] METHOD AND APPARATUS FOR PRODUCING ACTIVE CARBON BY FEEDING ELECTRICITY TO ROTARY REACTOR

[75] Inventor: Yoji Hiral, Omiya City, Japan

[73] Assignee: Helyo Shoji Kabushiki Kaisha, Omiya City, Japan

[21] Appl. No.: 265,387

[22] Filed: Jun. 24, 1994

[30] Foreign Application Priority Data

Jun. 29, 1993 [JP] Japan .................. 5-210837

[51] Int. Cl.⁶ .................. B01J 19/12; C01B 31/12
[52] U.S. Cl. .................. 422/186; 422/186.04; 423/220; 423/235; 423/445 R; 423/460; 423/461
[58] Field of Search .................. 422/186, 186.04; 423/220, 225, 445 R, 460, 461

[56] References Cited

U.S. PATENT DOCUMENTS

| | | | |
|---|---|---|---|
| Re. 29,101 | 1/1977 | Amagi et al. | 423/449 |
| 3,787,562 | 1/1974 | Heller et al. | 423/445 |
| 3,823,073 | 7/1974 | Minkkinen | 201/25 |
| 3,951,856 | 4/1976 | Repir et al. | 252/421 |
| 4,082,694 | 4/1978 | Wennerberg et al. | 252/444 |
| 4,083,801 | 4/1978 | Das | 252/422 |
| 4,631,180 | 12/1986 | Yoshimura et al. | 423/450 |
| 4,808,286 | 2/1989 | Angelo, II | 204/157.15 |
| 4,921,686 | 5/1990 | Yoshida et al. | 423/447.6 |
| 5,242,879 | 9/1993 | Abe et al. | 502/180 |
| 5,332,517 | 7/1994 | Torii et al. | 252/73 |

Primary Examiner—Donald P. Walsh
Assistant Examiner—Daniel Jenkins
Attorney, Agent, or Firm—Oldham, Oldham & Wilson Co.

[57] ABSTRACT

To produce active carbon particles by carbonizing a carbon based raw material in a steam atmosphere while feeding electricity to the raw material received in a rotary reactor, a plurality of electrical receiving rods are secured to the inner wall surface of a cylindrical wall of the rotary reactor in the equally-spaced relationship as seen in the circumferential direction. In operation, a certain intensity of electric current is fed to the electricity receiving rods via a plurality of electrodes and a plurality of electrode contacts to induce arc-discharging between the electricity receiving rods and the raw material received in the rotary reactor. To reliably prevent the temperature of the steam atmosphere from being abnormally elevated, carbon dioxide gas is introduced into a carbonizing chamber of the rotary reactor via a gas inflow pipe. To rotatably support the rotary reactor, the gas inflow pipe, a steam inflow pipe and a temperature sensor pipe, a rotary joint is disposed at the position located outside of a side wall of the rotary reactor. Nitrogen gas may be substituted for the carbon dioxide gas in order to attenuate the endothermic reaction arising in the rotary reactor. In addition, used active carbon particles can be re-activated in the carbonizing chamber of the rotary reactor by feeding electricity to the used active carbon particles via the electricity receiving rods.

10 Claims, 3 Drawing Sheets

METHOD AND APPARATUS FOR PRODUCING ACTIVE CARBON BY FEEDING ELECTRICITY TO ROTARY REACTOR

BACKGROUND OF THE INVENTION

1. Field of the Invention

The present invention relates to a method and an apparatus for producing active carbon particles by carbonizing a raw material in steam atmosphere while feeding electricity to the raw material received in a rotary reactor.

2. Description of the Related Art

A method of producing active carbon particles by dry-distilling a carbon based raw material, used active carbon particles or the like, and thereafter, feeding electricity to the raw material received in a rotary reactor so as to allow the raw material to be carbonized in the latter in a steam atmosphere is disclosed in an official gazette of Japanese Patent Laid-Open Publication NO. 4-97905.

According to the prior invention, the active carbon producing method is practiced such that a mixture gas atmosphere composed of a self-burnable gas (C) generated from the active carbon particles and a steam ($H_2O$) is heated to an elevated temperature ranging from 800° C. to 1000° C. to induce an endothermic reaction in the mixed gas atmosphere. This endothermic reaction is remarkably promoted with the mixture gas composed of carbon dioxide gas, hydrogen gas and oxygen gas after the temperature of the mixture gas atmosphere exceeds 800° C., resulting in the temperature of the mixed gas atmosphere being abnormally raised up. Since the carbon dioxide gas in the mixture gas atmosphere required for inducing the endothermic reaction is obtained only from the self-burnable gas derived from the active carbon particles, when a quantity of the hydrogen gas obtained from the steam in the mixture gas atmosphere relative to the limited quantity of the carbon dioxide gas exceeds a predetermined one, there arises a malfunction that the temperature of the mixture gas atmosphere is abnormally elevated.

SUMMARY OF THE INVENTION

The present invention has been made in consideration of the aforementioned background.

An object of the present invention is to provide a method of producing active carbon particles by carbonizing a carbon based raw material in a steam atmosphere while feeding electricity to the raw material received in a rotary reactor wherein abnormal elevation of the temperature of a mixture gas atmosphere can reliably be prevented.

Another object of the present invention is to provide an apparatus for producing active carbon particles by carbonizing a carbon based raw material in a steam atmosphere while feeding electricity to the raw material received in a rotary reactor wherein a method is employed for practically operating the apparatus of the foregoing type.

According to one aspect of the present invention, there is provided a method of producing active carbon particles by carbonizing a carbon based raw material in a steam atmosphere while feeding electricity to the raw material received in a rotary reactor to generate a large quantity of thermal energy enough to carbonize the raw material by the arc-discharging effect and the electrical resistance heating effect arising in the rotary reactor having a cylindrical configuration, wherein the method comprises a step of feeding a certain intensity of electric current to a plurality of electricity receiving rods secured to the inner wall surface of a cylindrical wall portion of the rotary reactor in the equally-spaced relationship as seen in the circumferential direction via a plurality of electrodes and a plurality of electrode contacts each prepared in the form of a carbon brush, a step of introducing steam into the interior of a carbonizing chamber of the rotary reactor via a steam inflow pipe horizontally extending through a rotary joint and a side wall portion of the rotary reactor, and a step of introducing gas into the interior of the carbonizing chamber of the rotary reactor via a gas inflow pipe likewise horizontally extending through the rotary joint and the side wall portion of the rotary reactor.

To exhaust the waste gas generated in the carbonizing chamber of the rotary reactor as a result of the arc-discharging effect, a waste gas exhausting port is disposed at the position located outside of the rotary joint.

Usually, the gas to be introduced into the carbonizing chamber of the rotary reactor is carbon dioxide gas.

Alternatively, the gas to be introduced into the carbonizing chamber of the rotary reactor may be nitrogen gas.

To detect the present temperature of the carbonizing chamber of the rotary reactor using a temperature sensor, a temperature sensor pipe is caused to horizontally extend through the rotary joint and the side wall portion of the rotary reactor, and the temperature sensor is connected to the foremost end of the temperature sensor pipe.

According to other aspect of the present invention, there is provided an apparatus for producing active carbon particles by carbonizing a carbon based raw material in a steam atmosphere while feeding electricity to the raw material received in a rotary reactor to generate a large quantity of thermal energy enough to carbonize the raw material by the arc-discharging effect and the electrical resistance heating effect arising in the rotary reactor having a cylindrical configuration, wherein the apparatus comprises a cylindrical wall portion molded of a refractory material and lined with a layer of thermal insulative material while including a cylindrical steel plate with the layer of thermal insulative material interposed between the cylindrical wall portion and the cylindrical steel plate, a side wall portion molded of a refractory material and lined with a layer of thermal insulative material while including a steel plate with the layer of thermal insulative material interposed between the side wall portion and the steel plate, a plurality of electrodes and a plurality of electrode contacts each prepared in the form of a carbon brush arranged on the cylindrical wall portion of the rotary reactor in the equally-spaced relationship as seen in the circumferential direction so as to feed electricity to the raw material via the electrodes and the electrode contacts, a waste gas exhausting pipe horizontally extending through the side wall portion of the rotary reactor so as to allow waste gas generated from the raw material in the rotary reactor to flow to the outside therethrough, a steam inflow pipe horizontally extending through the side wall portion of the rotary reactor so as to allow steam to be introduced into the interior of a carbonizing chamber of the rotary reactor therethrough, a gas inflow pipe horizontally extending through the side wall portion of the rotary reactor so as to allow gas to be introduced into the interior of the carbonizing chamber of the rotary reactor therethrough, a temperature sensor pipe horizontally extending through the side wall portion of the rotary reactor so as to allow a temperature sensor to be connected to the foremost end thereof for detecting the present temperature of the carbonizing chamber of the rotary reactor, and a rotary joint for rotatably supporting the rotary reactor while allowing the steam inflow pipe, the gas inflow pipe and the temperature sensor pipe to horizontally extend therethrough. In practice, the rotary joint is disposed at the position located outside of the side wall of the rotary reactor.

To feed electricity to the raw material received in the rotary reactor, a plurality of electricity receiving rods are secured to the inner wall surface of a cylindrical wall portion of the rotary reactor in the equally spaced relationship as seen in the circumferential direction in such a manner as to allow a certain intensity of electric current to be fed thereto via a plurality of electrodes and a plurality of electrode contacts in order to induce not only arc-discharging between the electricity receiving rods and the raw material but also electrical resistance heating of the raw material received in the rotary reactor.

In practice, a large part of heat is generated in the rotary reactor by the arc-discharging effect arising between the electricity receiving rods and the raw material and the remaining part of heat is generated by the electrical resistance heating effect arising with the raw material through which the fed electric current flows.

In the case of the conventional active carbon activating method as disclosed in the official gazette of Japanese Patent Laid-Open Publication NO. 4-97905 as mentioned above, the temperature of the atmospheric gas is abnormally elevated due to an endothermic reaction arising attributable to the presence of hydrogen gas in the atmosphere of the rotary reactor as represented by the following chemical formula.

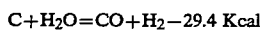

$$C + H_2O = CO + H_2 - 29.4 \text{ Kcal}$$

In contrast with the conventional active carbon particle producing method, according to the present invention, an endothermic reaction is caused with carbon dioxide gas introduced into the carbonizing chamber of the rotary reactor in conformity of the following chemical formula while preventing the temperature of the mixture gas atmosphere from being abnormally elevated owing to the absence of hydrogen gas in the rotary reactor.

$$C + CO_2 = 2CO - 40.8 \text{ Kcal}$$

In the case that nitrogen gas is introduced into the activating chamber of the rotary reactor, the arc-discharging effect can be attenuated compared with the case that the carbon dioxide gas is introduced into the same.

Other objects, features and advantages of the present invention will become apparent from reading of the following description which has been made in conjunction with the accompanying drawings

BRIEF DESCRIPTION OF THE DRAWINGS

The present invention is illustrated in the following drawings in which.

DESCRIPTION OF THE PREFERRED EMBODIMENT

The present invention will now be described in detail hereinafter reference to the accompanying drawings which illustrate a preferred embodiment thereof.

Figure 1:
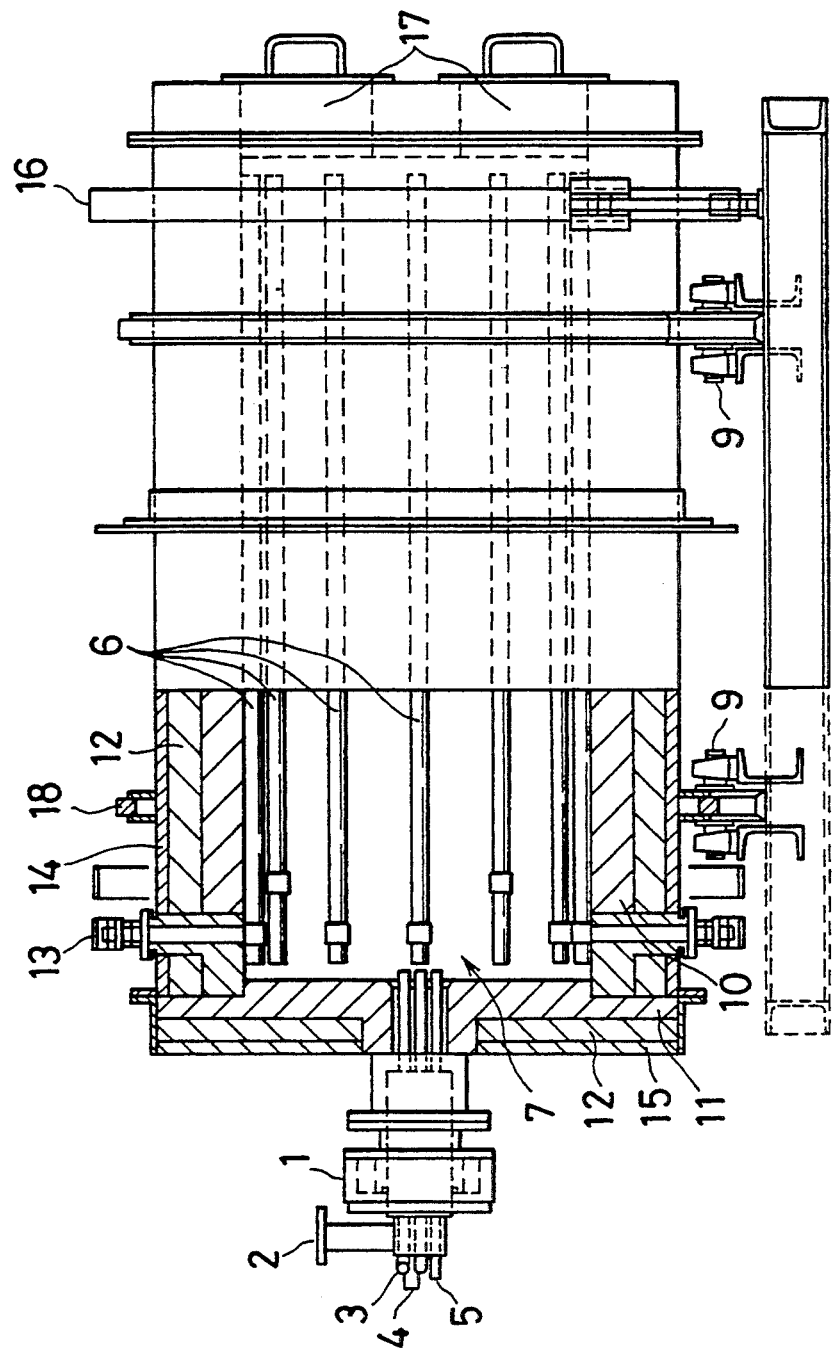
FIG. 1 is a partially exploded front view of an apparatus for producing active carbon particles by carbonizing a carbon based raw material while feeding electricity to the raw material received in a rotary reactor wherein the apparatus is constructed according to an embodiment of the present invention.
Figure 2:
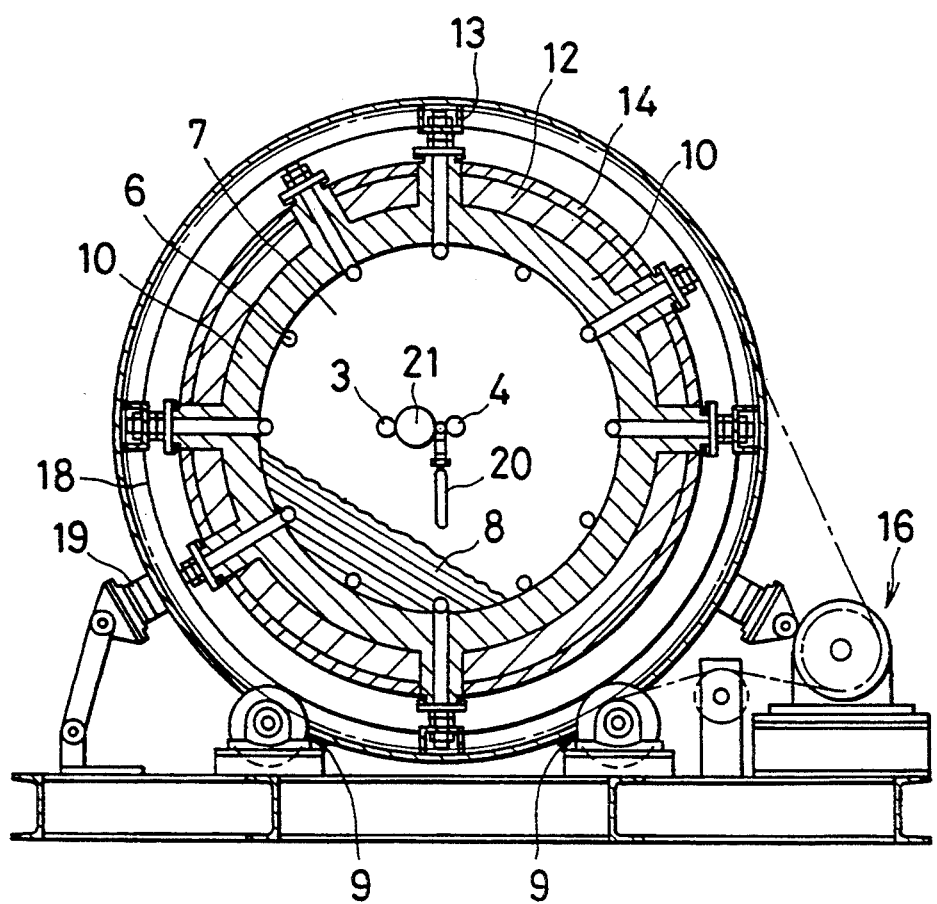
FIG. 2 is a cross-sectional view of the apparatus taken along line A—A in FIG. 1.
Figure 3:
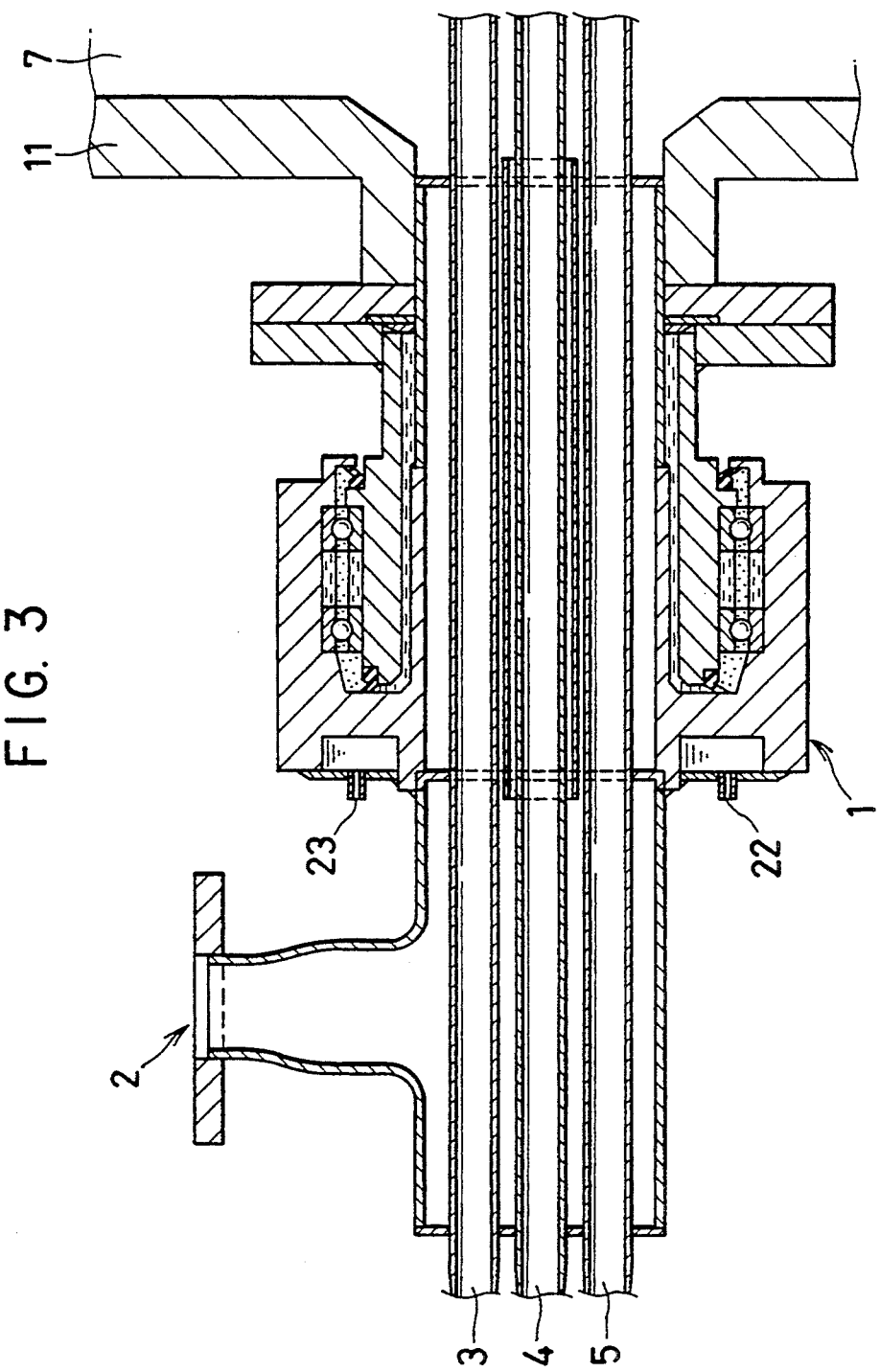
FIG. 3 is an enlarged sectional view of a rotary joint rotatably fitted to the apparatus shown in FIG. 1.

FIG. 1 is a partially exploded front view of an active carbon producing apparatus constructed according to the embodiment of the present invention, FIG. 2 is a cross-sectional view of the apparatus taken along line A—A in FIG. 1, and FIG. 3 is an enlarged sectional view of a rotary joint rotatably fitted to the rotary reactor of the apparatus shown in FIG. 1.

The apparatus includes a rotary reactor 7 which is rotatably mounted on four rotors 9 via two rotor rails 18 each extending around a cylindrical drum of the rotary reactor 7. Two rotors 9 are located at the fore positions of the rotary reactor 7 corresponding to the fore rotor rail 18, and other two rotors 9 are located at the rear positions of the same corresponding to the rear rotor rail 18. The cylindrical drum of the rotary reactor 7 is composed of a cylindrical steel plate 14 defining the outer peripheral surface of the rotary reactor 7, a cylindrical wall 10 molded of a refractory material, and a thermal insulative layer 12 of glass wool interposed between the steel plate 14 and the cylindrical wall 10 for thermally isolating the cylindrical wall 10 from the outside. In addition, the rotary reactor 7 includes a left-hand side wall 11 likewise molded of a refractory material to define an activating chamber of the rotary reactor 7 in cooperation with the cylindrical wall 10. To thermally isolate the side wall 11 from the outside, the side wall 11 is lined with a thermal insulative layer 12 of glass wool, and a steel plate 15 is arranged for the side wall 11 of the rotary reactor 7 outside of the thermal insulative layer 12 to reinforce the side wall 11 with the steel plate 15 while the thermal insulative layer 12 is interposed between the side wall 11 and the steel plate 15.

While the rotary reactor 7 is rotatably mounted on the four rotors 9, it is rotationally driven by a driving unit 16 including a driving endless chain meshing with a sprocket mounted around the outer peripheral surface of the rotary reactor 7 and a speed reducing unit serving as a driving power source.

A plurality of electricity receiving rods 6 (twelve electricity receiving rods in the shown case) each extending in the longitudinal direction of the cylindrical wall 10 are secured to the inner wall surface of the cylindrical wall 10 while they are arranged in the equally-spaced relationship as seen in the circumferential direction. Thus, a certain intensity of electric current can be fed to each of the electricity receiving rods 6 from the outside of the rotary reactor 7 via a plurality of electrodes 13 and a plurality of electrode contacts 19 each prepared in the form of a carbon brush.

In addition, the rotary reactor 7 includes a rotary joint 1 which is disposed outside of the side wall 11 in the concentrical relationship relative to the rotary reactor 7, and a waste gas exhausting pipe 21, a gas inflow pipe 3, a steam inflow pipe 4 and a temperature sensor pipe 5 are inserted into the activating chamber of the rotary reactor 7 through the rotary joint 1. A temperature sensor 20 is connected to the foremost end of the temperature sensor pipe 5.

The waste gas exhausting pipe 21 is communicated with a waste gas exhausting port 2 located at the left-hand end part of the rotary reactor 7 as seen in FIG. 3, the gas inflow pipe 3 is connected to a carbon dioxide gas supply source or a nitrogen gas supply source (not shown) at the left-hand end thereof, the steam inflow pipe 4 is connected to a steam supply source (not shown) at the left-hand end thereof, and the temperature sensor pipe 5 is connected to a temperature displaying unit (not shown) at the left-hand end thereof.

As is best seen in FIG. 3, the rotary joint 1 serves to rotatably support not only the rotary reactor 7 but also the waste gas exhausting pipe 21, the gas inflow pipe 3, the steam inflow pipe 4 and the temperature sensor pipe 5 each of which is kept immovable regardless of rotation of the rotary reactor 7, with the aid of a bearing disposed between the rotary joint 32 and the rotary reactor 7 side. To cool the bearing and the peripheral part of the latter, cooling water is caused to flow through the rotary joint 1 by entering the rotary joint 1 from a cooling water inlet port 22 and leaving the same from a cooling water outlet port 23.

As shown in FIG. 1, a lid 17 having handles secured thereto is detachably fitted to the right-hand end wall of the rotary reactor 7 located opposite to the rotary joint 1 side so that a carbon based raw material required for producing active carbon particles is supplied from the right-hand side of the rotary reactor 7 so as to allow the raw material to be carbonized in a carbonizing chamber of the rotary reactor 7. After completion of the carbonizing operation in the rotary reactor 7, the lid 17 is openably removed from the rotary reactor 7 with the aid of the handles, and thereafter, a product of active carbon particles is taken out from the rotary reactor 7.

Referring to FIG. 2, the active carbon particles 8 are received in the inclined state in the rotary reactor 7 as represented by a plurality of hatched lines.

Next, a mode of operation of the apparatus constructed in the aforementioned manner will be described below.

Wood chips, wood particles arising during a sawing operation, pulp based waste liquid and palm nut shells are typically noted as a plant based raw material employable for the apparatus. In addition, coal, heavy oil, thermally decomposed coal and oil pitch are typically noted as a mineral based raw material employable for the apparatus. In this embodiment, to operate the apparatus, palm nut shells were heated and dry-distilled in a radiating type dry-distilling facility (not shown) while they were isolated from the outdoor atmosphere, whereby they were carbonized to obtain a raw material to be supplied to the rotary reactor 7. On completion of the dry-distillation of the palm nut shells, the lid 17 was openably removed from the rotary reactor 7 with the aid of the handles, and subsequently, the dry-distilled palm nut shells, i.e., the raw material was introduced into the rotary reactor 7 through an opening portion of the latter. Thereafter, the rotary reactor 7 was rotationally driven in the clockwise direction in the shown case by operating the driving unit 16 via the speed reducing unit, the driving endless chain and the sprocket so that the raw material received in the rotary reactor 7 was continuously turnably displaced in the inclined state as shown in FIG. 2 during the rotation of the rotary reactor 7.

Subsequently, a certain intensity of electric current was fed to the respective electricity receiving rods 6 via the electrode contacts 19 and the electrodes 13 in order to generate Joule's heat in cooperation with the raw material by the arc-discharging effect arising between the electricity receiving rods 6 and the raw material, whereby a large quantity of thermal energy enough to carbonize the raw material was given to the latter, causing the temperature of the mixture gas atmosphere to be elevated to a level ranging from 800° to 1000° C. This elevated temperature was detected by the temperature sensor 20 disposed at the substantially central part of the rotary reactor 7. After the elevated temperature was detected in that way, steam was blown in the interior of the rotary reactor 7 from the foremost end of the steam inflow pipe 4, and at the same time, carbon dioxide gas was blown in the same from the foremost end of the gas inflow pipe 3, whereby the raw material was fully carbonized in the presence of the steam and the carbon dioxide gas. At this time, a quantity of the carbon dioxide gas was set to 3% based on a quantity of the mixture gas composed of the steam and the self-burnable gas derived from the raw material. On completion of the carbonizing operation for the raw material, active carbon particles 8 were produced in the rotary reactor 7. Subsequently, the lid 17 was openably removed from the rotary reactor 7 so that the active carbon particles 8 were taken out from the rotary reactor 7 to be displaced to a cooling chamber (not shown) located away from the rotary reactor 7 in which a final product of active carbon particles was obtained after they were cooled.

As is apparent from the above description, the apparatus constructed in the above-described manner makes it possible to carbonize a raw material required for producing active carbon particles at a high efficiency without any appearance of a phenomenon that the temperature of the mixture gas atmosphere is abnormally elevated even through it reaches a temperature of 1000° C.

The present invention has been described above with respect to the case that palm nut shells are employed as a raw material to be supplied to the apparatus. However, the present invention should not be limited only to them. Alternatively, other type of carbon based raw material may be substituted for the palm nut shells.

In addition, nitrogen gas may be substituted for the carbon dioxide gas so as to allow the nitrogen gas to be blown in the rotary reactor 7 from the foremost end of the gas inflow pipe 3.

Conclusively, the apparatus constructed according to the present invention makes it possible to carbonize a raw material required for producing active carbon particles with a simple structure at a high efficiency without any appearance of a phenomenon that the temperature of the mixture gas atmosphere is abnormally elevated even though it reaches a temperature ranging from 800° to 1000° C.

It should be added that the apparatus of the present invention can be used also for re-activating used active carbon particles in the same manner as mentioned above.

While the present invention has been described above with respect to a single preferred embodiment thereof, it should of course be understood that the present inven-

What is claimed is:

1. A method of producing active carbon particles by carbonizing a carbon based raw material in a steam atmosphere while feeding electricity to said raw material received in a rotary reactor to generate quantity of thermal energy enough to carbonize said raw material by arc-discharging and electrical resistance heating arising in said rotary reactor having a cylindrical configuration, comprising the steps of:

feeding a certain intensity of electric current to a plurality of electricity receiving rods secured to an inner wall surface of a cylindrical wall portion of said rotary reactor in equally-spaced relationship as seen in a circumferential direction via a plurality of electrodes and a plurality of electrode contacts each formed as a carbon brush, introducing steam into the interior of a carbonizing chamber of said rotary reactor via a steam inflow pipe extending substantially horizontally through a rotary joint and a side wall portion of said rotary reactor, and introducing gas into said carbonizing chamber of said rotary reactor via a gas inflow pipe likewise extending substantially horizontally through said rotary joint and said side wall portion of said rotary reactor.

2. The method as claimed in claim 1 further including a step of exhausting waste gas generated in said carbonizing chamber of said rotary reactor as a result of the arc-discharging effect via a waste gas exhausting port located outside of said rotary joint.

3. The method as claimed in claim 1, wherein said gas to be introduced into said carbonizing chamber of said rotary reactor is carbon dioxide gas.

4. The method as claimed in claim 1, wherein said gas to be introduced into said carbonizing chamber of said rotary reactor is nitrogen gas.

5. The method as claimed in claim 1, wherein a temperature sensor pipe is caused to horizontally extend through said rotary joint and said side wall portion of said rotary reactor so as to allow a temperature sensor to be connected to the foremost end of said temperature sensor pipe for detecting the present temperature of said carbonizing chamber of said rotary reactor.

6. An apparatus for producing active carbon particles by carbonizing a carbon based raw material in a steam atmosphere while feeding electricity to said raw material received in a rotary reactor to generate a large quantity of thermal energy enough to carbonize said raw material by arc-discharging and electrical resistance heating arising in said rotary reactor having a cylindrical configuration, comprising;

a cylindrical wall portion molded of a refractory material and lined with a layer of thermal insulative material while including a cylindrical steel plate with said layer of thermal insulative material interposed between said cylindrical wall portion and said cylindrical steel plate, a side wall portion molded of a refractory material and lined with a layer of thermal insulative material while including a steel plate with said layer of thermal insulative material interposed between said side wall portion and said steel plate, a plurality of electrodes and a plurality of electrode contacts each prepared in the form of a carbon brush arranged on said cylindrical wall portion of said rotary reactor in equally spaced-relationship as seen in a circumferential direction so as to feed electricity to said raw material via said electrodes and said electrode contacts, a waste gas exhaust pipe horizontally extending through said side wall portion of said rotary reactor so as to allow waste gas generated from said raw material received in said rotary reactor to flow therethrough, a steam inflow pipe horizontally extending through said side wall portion of said rotary reactor so as to allow steam to be introduced into the interior of a carbonizing chamber of said rotary reactor therethrough, a gas inflow pipe horizontally extending through said side wall portion of said rotary reactor so as to allow gas to be introduced into the interior of said carbonizing chamber of said rotary reactor therethrough, a temperature sensor pipe horizontally extending through said side wall portion of said rotary reactor so as to allow a temperature sensor to be connected to a foremost end thereof for detecting the present temperature of said carbonizing chamber of said rotary reactor, and a rotary joint for rotatably supporting said rotary reactor while allowing said steam inflow pipe, said gas inflow pipe and said temperature sensor pipe to horizontally extend therethrough, said rotary joint being disposed at a position located outside of said side wall portion of said rotary reactor.

7. The apparatus as claimed in claim 6, wherein said gas to be introduced into said carbonizing chamber of said rotary reactor is carbon dioxide gas.

8. The apparatus as claimed in claim 6, wherein said gas to be introduced into said carbonizing chamber of said rotary reactor is nitrogen gas.

9. The apparatus as claimed in claim 6, wherein a plurality of electricity receiving rods are secured to the inner wall surface of said cylindrical wall portion of said rotary reactor in the equally-spaced relationship as seen in the circumferential direction so as to allow electricity to be fed thereto via said electrode and said electrode contacts.

10. The apparatus as claimed in claim 6, wherein a waste gas exhausting port is disposed at the position located outside of said side wall portion of said rotary reactor so as to allow waste gas generated from said carbonized raw material in said rotary reactor to be exhausted from said carbonizing chamber of said rotary reactor to the outside via said waste gas exhausting pipe and said waste gas exhausting port.

* * * * *

UNITED STATES PATENT AND TRADEMARK OFFICE
CERTIFICATE OF CORRECTION

PATENT NO. : 5,424,039
DATED : June 13, 1995
INVENTOR(S) : Yoji Hiral

It is certified that error appears in the above-indentified patent and that said Letters Patent is hereby corrected as shown below:

Title page, item [73], inventor: should read --Yoji Hirai--.

Signed and Sealed this

Fourteenth Day of January, 1997

Attest:

BRUCE LEHMAN

*Attesting Officer*  *Commissioner of Patents and Trademarks*